ROBERT ROUCACHE &
DANIEL ROUSSEAU,
INVENTORS
By
Stephen H. Frishauf
Atty

United States Patent Office 3,514,720
Patented May 26, 1970

3,514,720

TRANSFORMERLESS BALANCED-TYPE AMPLITUDE OR PHASE MODULATOR-DEMODULATOR CIRCUIT

Robert Roucache, Croissy-sur-Seine, and Daniel Rousseau, Paris, France, assignors to Compagnie Francaise Thomson Houston-Hotchkiss Brandt, Paris, France, a corporation Filed Mar. 17, 1967, Ser. No. 623,852
Claims priority, application France, Mar. 31, 1966, 55,838
Int. Cl. H03c 1/54; H03d 3/18
U.S. Cl. 332—43 10 Claims

ABSTRACT OF THE DISCLOSURE

A balanced modulator-demodulator circuit having one or two pairs of diodes interconnected with impedances in a balanced network having three pairs of terminals across two of which respective input signals in phase-coherent relation can be applied, so as to derive across the third pair of terminals an output signal in phase-coherent relation with the input signals and representing the modulation or demodulation product thereof, and having an inductance-free signal-coupling arrangement for applying one input signal as two opposite-phase voltages across the related pair of terminals, comprising a transistor receiving the signal on its base and having emitter and collector load resistances connected to said terminals.

SUMMARY

This invention relates to modulator-demodulator circuits of the balanced type, for the amplitude modulation and demodulation of phase-coherent alternating signals with carrier suppression. By "phase-coherent" signals, in the specification and claims, is meant alternating signals that are co-phasal or are in phase-opposition.

A circuit of this kind generally includes a network of unidirectional switching elements, such as diodes, interconnected with impedances so as to provide three pairs of terminals. When two input signals, in phase-coherent relation, are applied across the terminals of two respective ones of said pairs, an output signal which is in phase-coherent relation with the input signals and represents the suppressed-carrier modulation or demodulation product thereof, is collected across the third pair of terminals.

The above mentioned network may consist of four diodes arranged in a "ring," in which case a so-called double-balanced modulator network is had, or it may consist of only two diodes connected in aiding relation, to provide a so-called single-balanced modulator network. In either case, one of the two phase-coherent input signals, specifically the radio-frequency carrier or reference signal, is applied to one pair of terminals of the network in such a manner as to forward-bias the unidirectional switching elements, such as diodes, and render them conductive during semi-cycles of one polarity, and reverse-bias them and render them non-conductive during the semi-cycles of the other polarity. In these conditions, should another pair of terminals of the network receive a suppressed-carrier modulated input signal, the network will act to deliver at the third pair of terminals a demodulated output signal representing the low-frequency modulating component of said input signal; and should said other pair of terminals receive a low-frequency modulating signal, the network will act to deliver across the third pair of terminals a modulated output signal representing the suppressed-carrier-modulation product of said carrier with said modulating signal.

In balanced modulator-demodulator circuits of this type, it is essential that each of the three signals involved in the operation of the circuit shall appear across the related pair of network terminals in the form of two co-varying voltages in precisely anti-phasal relation to each other. This requirement has generally been met by providing at least one coupling transformer, and commonly two transformers, with one of the signals being present across a winding of said transformer and another signal at the midpoint of said winding.

Balanced modulators of the type described are simple, reliable and efficient pieces of equipment which have been used for many years in the field of communications with excellent results. However, the present trend in that field is towards an ever wider utilization of miniature and subminiature equipment using integrated circuit and related techniques. Transformers are not susceptible to these techniques, and even a single transformer represents enormous bulk, weight and expense when compared with all of the remaining components of a balanced modulator circuit when such remaining components are constructed as integrated cicruitry. A further disadvantage of transformer coupling is that it tends to impair the frequency response of the circuit.

A primary object of this invention is to provide inductance-free balanced modulator circuits making exclusive use of circuit elements, including transistors, resistors and capacitors, capable of thorough miniaturization. According to an important aspect of the invention this object is accomplished by providing a signal-coupling arrangement comprising a transistor biased for linear operation and having one of the input signals applied to its base, and load resistances connected to its emitter and collector respectively, said emitter and collector being further connected to a related pair of input terminals of the network, whereby said input signal will be applied as two co-varying opposite-phase voltage across said respective terminals.

DESCRIPTION

The invention was developed in the specific context of colour television systems in which colour information is transmitted by means of a suppressed-carrier, amplitude-modulated subcarrier. While this represents a particularly important application of the invention, it should be understood that the invention is applicable in all instances in which balanced modulator-and-demodulator circuits are conventionally used or are usable, including radio, television, and telephone links, telemetry, instruments, and so on. While amplitude modulation will be expressly referred to in the ensuing disclosure for clarity, it should be understood that the invention is also usable with phase-modulated signals.

Exemplary embodiments of the invention will now be described for purposes of illustration but not of limitation with reference to the accompanying drawings, wherein.

Figure 1:
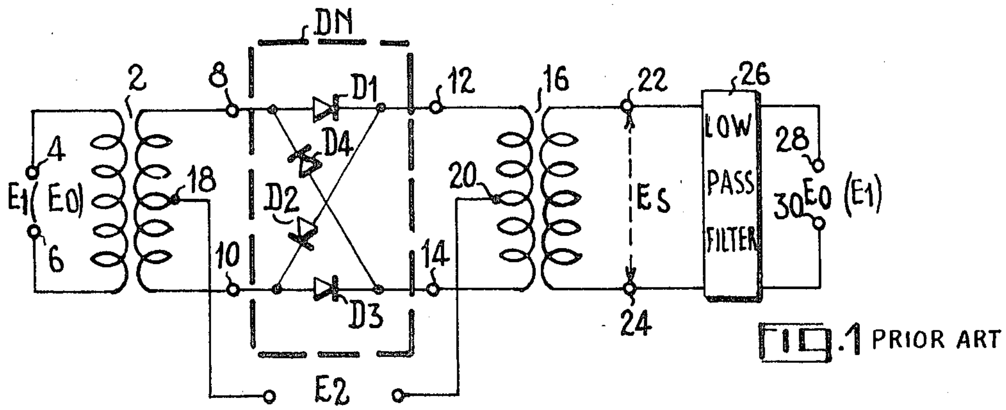
FIG. 1 represents prior art and is given for comparative purposes, showing a conventional double-balanced ring modulator using input and output coupling transformers.

In the conventional balanced modulator circuit shown in FIG. 1, 2 designates an input coupling transformer having a first input signal $E_1$ applied across the terminals 4, 6 of its primary winding. The terminals 8 and 10 of the secondary winding of the transformer are connected to the input terminals of a ring diode network generally designated DN, having the output terminals 12 and 14. Ring network DN comprises for rectifier diodes $D_1$ through $D_4$, which are connected with such polarities that diodes $D_1$ and $D_3$ conduct positively from input terminals 8 and 10 to output terminals 12 and 14 respectively, and diodes $D_2$ and $D_4$ conduct positively from output terminals 12 and 14 to input terminals 8 and 10 respectively. In other words the four diodes are connected to provide a continuous unidirectionally conducting ring around the four-pole network DN. The output terminals 12 and 14 of ring network are connected to the primary winding terminals of an output coupling transformer 16. The secondary of input transformer 2 and the primary of output transformer 16 have center taps 18 and 20, across which a second input signal $E_2$ is applied. The secondary terminals 22 and 24 of output transformer 16 are connected by way of a low-pass filter 26 to the output terminals 28 and 30 of the circuit.

The circuit just described is well-known as a double-balanced modulator, and is able to modulate and demodulate signals with carrier suppression. The operation of the circuit will be briefly reviewed in the case of demodulating operation.

Figure 3:
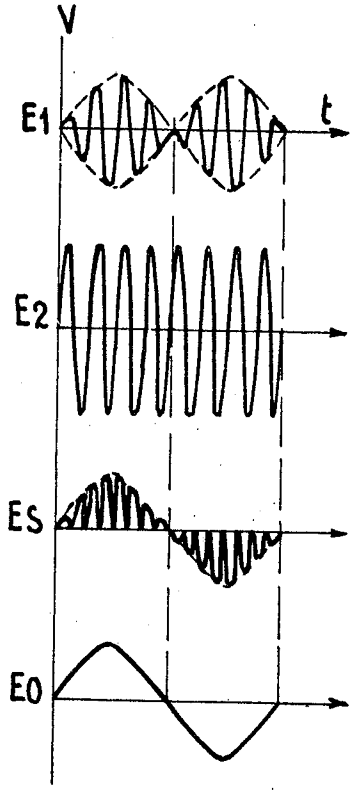
FIG. 3 shows a set of waveforms serving to explain the operation of the circuit of FIG. 2.

For demodulation, a carrier-suppressed amplitude-modulated input signal $E_1$, a typical waveform of which is shown at the upper line of FIG. 3, is applied to the input terminals 4–6. A constant-amplitude demodulating signal $E_2$, synchronous in frequency and phase with the suppressed carrier of the input signal, is simultaneously applied across the second input terminals 18–20, from a suitable reference source not shown. The waveform for signal $E_2$ is shown at the second line of FIG. 3. First assuming the demodulating signal $E_2$ is applied alone, that is in the absence of signal $E_1$ to be demodulated across terminals 4–6, then it is easily seen that the ring output terminals 12 and 14 both carry equal-amplitude oscillatory voltages that are co-phasal, or in phase opposition, so that the voltage difference across the primary of output transformer $T_2$ remains constantly zero and no output signal is delivered by the circuit. It is also seen however that, in the conditions just referred to, during those semi-cycles of the demodulating signal $E_2$ when transformer mid-tap 20 is positive with respect to mid-tap 18, diodes $D_2$ and $D_4$ are forward biassed and diodes $D_1$ and $D_3$ are reverse-biassed, whereas during the remaining semi-cycles diodes $D_1$ and $D_3$ are forward-biassed and diodes $D_2$ and $D_4$ reverse-biassed. Hence, if it is now assumed that the suppressed-carrier, amplitude-modulated input signal $E_1$ is applied to terminals 4–6, in a phase-relationship with respect to demodulating signal $E_2$ such that ring input terminal 8 is carried positive by the demodulated signal $E_1$ at the same time mid-tap 20 is carried positive by demodulating signal $E_2$, then during the first set of semi-cycles referred to above (when mid-tap 20 is positive with respect to mid-tap 18), the forward-biassed diodes $D_2$ and $D_4$ apply the positive and negative voltages present at ring input terminals 8 and 10, respectively to the ring output terminals 14 and 12 while the reverse-biassed diodes $D_1$ and $D_3$ fail to conduct, and during the second set of semi-cycles the forward-biassed diodes $D_1$ and $D_3$ apply the negative and positive voltages present at terminals 8 and 10 respectively to output terminals 12 and 14 while diodes $D_2$ and $D_4$ fail to conduct. The net result is that a rectified voltage of one polarity and of an amplitude corresponding to the instantaneous $E_1$ signal amplitude, is present across the primary of output transformer 16. Conversely if the phase relationship of signal $E_1$ with respect to demodulating signal $E_2$ is such that ring input terminal 8 is carried negative by the signal at the same time mid-tap 20 is carried positive by the demodulating signal $E_2$, then a net rectified voltage of the opposite polarity, and again of an amplitude corresponding to that of the $E_1$ signal, is present across the output transformer primary.

The resulting signal $E_s$ appearing across the secondary terminals 22 and 24 of output transformer 16 is therefore of the form shown in the third line of FIG. 3, in the case of a sinusoidally-modulated input signal of the form here illustrated. When this resulting signal $E_s$ is passed through a low-pass filter 26, the output signal $E_0$ appearing at the system output terminals 28–30, is the envelope voltage wave shown in the bottom line of FIG. 3, and represents the modulating signal voltage of the signal $E_1$.

The circuit of FIG. 1 will also function as a carrier-suppressing amplitude-modulator circuit, if a radio-frequency carrier signal of constant amplitude, such as the signal $E_2$ in FIG. 3, is again applied to the terminals 18–20, and a low-frequency modulating signal, such as that shown at $E_0$ in FIG. 3, is applied across the first input terminals 4–6. The signal appearing across the output transformer terminals 22–24 then is the carrier-suppressed modulated signal of the form at $E_1$ in FIG. 3.

Both for modulating and demodulating operation, the system of FIG. 1 can be operated with the suppression of one of the sidebands in addition to the carrier, as through suitable design of the output filter 26, in case of demodulation, should single sideband operation be desired as is well-known in the art.

The conventional double balanced modulator-demodulator circuit of FIG. 1 is highly satisfactory and has been widely used in communications engineering, but it has a major drawback for many applications because of the need for the transformers such as 2 and 16. Transformers are incapable of sub-miniaturization and the whole system becomes unsuitable for use in cases where integrated circuit construction is desired. Moreover, transformers introduced difficulties in connection with the frequency response.

Figure 2:
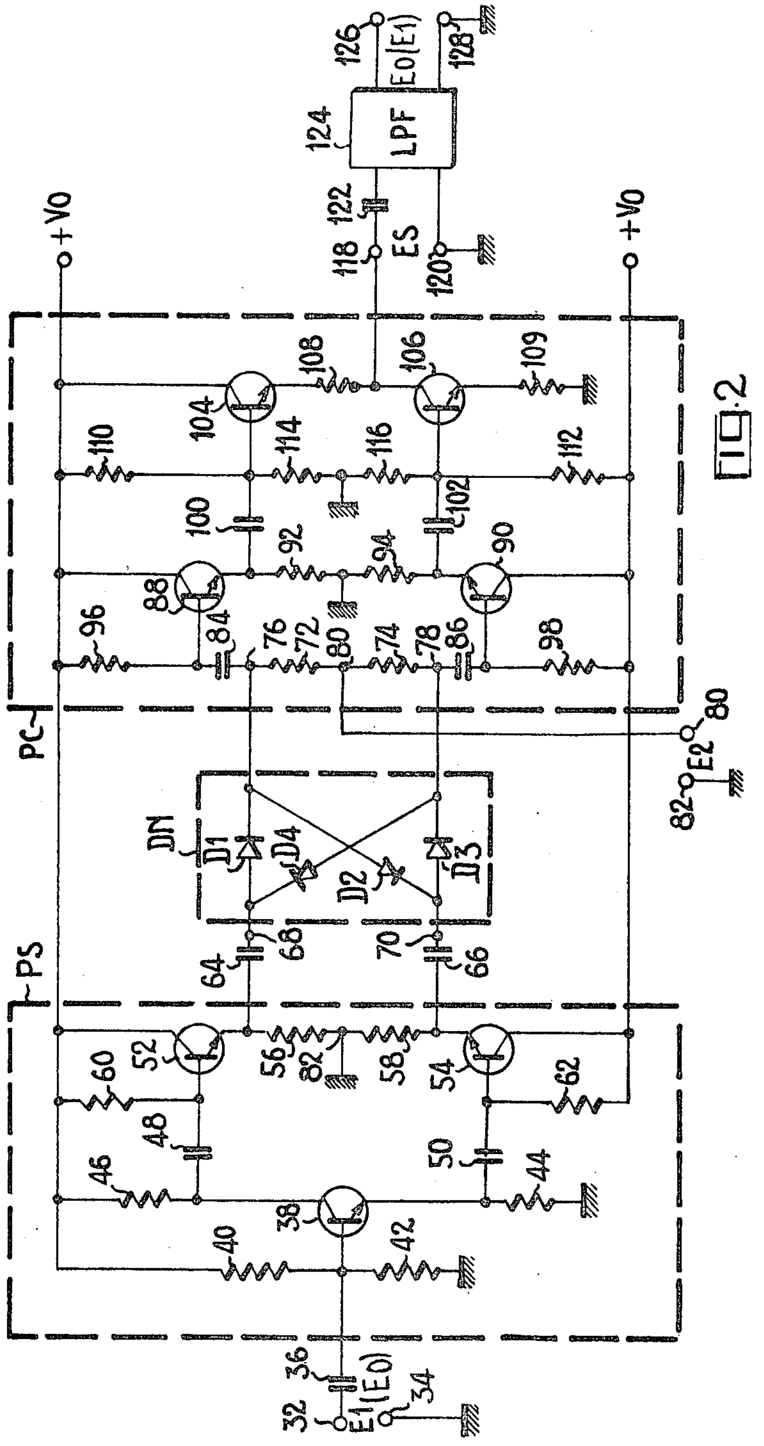
FIG. 2 illustrates an embodiment of a double-balanced ring modulator and demodulator circuit according to the invention.

An embodiment of the invention is shown in FIG. 2, where a double-balanced modulator-demodulator circuit is illustrated functionally equivalent to that described with reference to FIG. 1. According to the invention, the input and output coupling transformers are replaced by transistorized input and output coupling circuits all the components of which are readily susceptible of miniaturization.

As illustrated, the system has the pair of first input terminals 32 and 34, the latter being here shown grounded. Input terminal 32 is connected by way of a coupling capacitor 36 to the base of an input transistor 38, here shown as of NPN type. A suitable base bias voltage is applied to the transistor through a resistor 40 connected between a positive voltage line *Vo* and the base, and a resistor 42 between the base and ground. Transistor 38 has its emitter connected to ground through an emitter-load resistor 44 and its collector connected to voltage line *Vo* through a collector-load resistor 46. The emitter and collector of transistor 38 are connected through coupling capacitors 48 and 50 to the bases of respective NPN transistors 52 and 54 which are connected in symmetrical, common collector circuits. That is, both transistors 52 and 54 have their collectors connected to the positive voltage line $+V_o$ and have their emitters grounded through load resistors 56 and 58. The bases are biased from voltage line $+V_o$ through the base-bias resistor 60 and 62. The emitter load resistors 56 and 58 have their loaded terminals connected through coupling capacitors 64 and 66 to the ring-input terminals 68 and 70 of a diode ring network generally designated DN and including the unidirectionally-poled diodes $D_1$ and through $D_4$, as described with reference to FIG. 1.

Considering the input section (designated PS) of the circuit described, it will be noted that when an input signal $E_1$ (in the case of demodulating operation) or $E_o$ (in case of modulating operation) is applied from the first input terminals 32–34 across the base of input transistor 38 and ground, the input transistor operates to deliver corresponding signal voltages in phase-opposition, at its emitter and collector terminals respectively. These phase-opposed signal voltages are passed by coupling capacitors 48 and 50 to the bases of the common collector-connected transistors 52 and 54. These transistors serve for impedance-matching purposes, and pass the mutually opposed input signal voltages, with equal low impedance characteristics, to the extremities of the center-grounded resistance chain 56–58. The phase opposed signal voltages are thus coupled with a low input impedance over condensers 64–66, to the diode ring network input terminals 68–70. It will therefore be apparent that the over-all action of the input coupling section PS just described is equivalent to that of the input coupling transformer 2 in FIG. 1.

The output coupling section PC of the circuit includes the resistors 72 and 74 connected to the diode ring output terminals 76 and 78 and having a common junction constituting the terminal 80. This terminal 80 together with the grounded terminal 82 provides the second input terminals of the circuit, across which the radio-frequency reference signal $E_2$ is applied. The diode ring output terminals 76 and 78 are further connected through coupling capacitors 84 and 86 to the bases of respective transistors 88 and 90. These are connected in symmetrical, common-collector circuits in a similar manner as are the transistors 52 and 54, and serve a similar impedance matching function. Transistors 88 and 90 have their collectors connected to voltage line $+V_o$ and have their emitters connected through load resistors 92 and 94 to ground. The bases of 88 and 90 are biased through resistors 96 and 98 from positive line $+V_o$. The emitters of output impedance-matching transistors 88 and 90 are further connected through coupling capacitors 100 and 102 to the bases of the output transistors 104 and 106.

Transistors 104 and 106 are mounted in a series pushpull amplifier arrangement, with the emitter of 104 connected through a load resistor 108 to the collector of 106. The collector of 104 is connected to voltage line $+V_o$ and the emitter of 106 is connected through a resistor 109 to ground. The bases of 104 and 106 are biased through resistors 110 and 112 from the positive voltage line $+V_o$, and through 114, 116 to ground. The collector of 106 is connected to one, 118, of the intermediate-output terminals 118–120, the other terminal 120 being grounded. Terminal 118 is further coupled through a capacitor 122 with one input of filter 124 whose other input terminal is grounded. The output terminals 126 and 128 of the filter 124, terminal 128 being grounded, constitute the circuit output terminals across which the output signal $E_0$ (in demodulator operation) or $E_1$ (in modulator operation) are delivered.

The operation of the FIG. 2 circuit is as follows. When a constant-amplitude reference signal of radio frequency (such as $E_2$, FIG. 3) is applied alone across the second input terminals 80–82, in the absence of any signal applied to first input terminals 32–34, then at every semi-cycle of the reference voltage $E_2$ during which mid-tap 80 is positive with respect to grounded mid-tap 82, both ring output terminals 76 and 78 deliver co-phasal, equal-amplitude voltages similar to the reference signal voltage $E_2$. These co-phasal voltages are passed by way of the coupling capacitors 84 and 86, impedance-matching transistors 88 and 90, and capacitors 100 and 102, to the bases of the respective pushpull amplifier stages 104 and 106. As a result of the co-phasally varying voltages applied to their bases, both transistors 104 and 106 tend to be rendered conductive and non-conductive in unison, so that the voltage applied through resistor 108 to terminal 118 remains substantially constant. Thus, no output signal is delivered by the system.

The co-phasal, equal-amplitude voltages appearing at ring output terminals 76 and 78 act to forward-bias both diodes $D_2$ and $D_4$ and reverse-bias diodes $D_1$ and $D_3$ during every semi-cycle of said reference voltage when mid-tap 80 is positive with respect to grounded mid-tap 82, and act to forward-bias diodes $D_1$ and $D_3$ and reverse-bias diodes $D_2$ and $D_4$ during the remaining reference voltage semi-cycles.

If now the system is operated as a demodulator, with a suppressed-carrier amplitude-modulated signal such as $E_1$ applied across the terminals 32–34, then as earlier described the input circuitry of the invention applies such signal across ring input terminals 68–70. Assuming said first input signal $E_1$ is co-phasal with the reference signal $E_2$, then during every semi-cycle when both ring input terminal 68 and mid-tap 80 are simultaneously positive, the positive voltage at terminal 68 is passed through forward-biassed diode $D_4$ to ring output terminal 78, and the negative voltage at terminal 70 is passed through forward-biassed diode $D_2$ to ring output terminal 76. During the remaining semi-cycles when both terminals 68 and 80 are simultaneously negative, the negative voltage at 68 is passed through diode $D_1$ to 76 and the positive voltage at 70 is passed through $D_3$ to 78. The net result is a rectified voltage difference of one polarity, with 78 positive over 76, and of an amplitude corresponding to that of signal $E_1$, across terminals 76–78 and across resistance chain 72–74. Conversely, should $E_1$ be anti-phasal relative to $E_2$, i.e. should ring input 68 go positive when mid-tap 80 is going negative, then a net rectified voltage difference of the opposite polarity, with 78 negative over 76, and again corresponding in amplitude to signal $E_1$, will appear across the terminals 76–78 and resistance 72–74.

In either case the opposite-polarity voltages appearing at terminals 76 and 78 are applied through coupling capacitors 84 and 86 and impedance-matching transistors 88 and 90 followed by capacitors 100 and 102, to the bases of the pushpull series stages 104 and 106 respectively. The opposite-polarity voltages on the bases of transistors 104 and 106 act to render each one of the transistors more conductive alternately, and the other transistor simultaneously less conductive. The voltage applied through resistor 108 to terminal 118 is therefore varied in accordance with the rectified signal voltage difference present across the ring output terminals 76–78, providing an intermediate signal such as $E_s$ (FIG. 3). When this intermediate signal is filtered in filter 124, the modulating voltage envelope appears as the output signal $E_0$ across terminals 126–128.

If the system is operated as a modulator instead of a demodulator, then a modulating (e.g. audio-frequency) signal such as $E_0$ is applied to the first input terminals 32–34 instead of the signal $E_1$, and a suppressed-carrier, amplitude-modulated signal such as $E_s$ is collected across terminals 118–120. If desired, a single side-band output modulated signal may be obtained by suitably selecting the filter characteristics as will be apparent to those familiar with the art. According to an important feature of the invention, the transistors in FIG. 2 are biassed in class A for linear operation.

Figure 4:
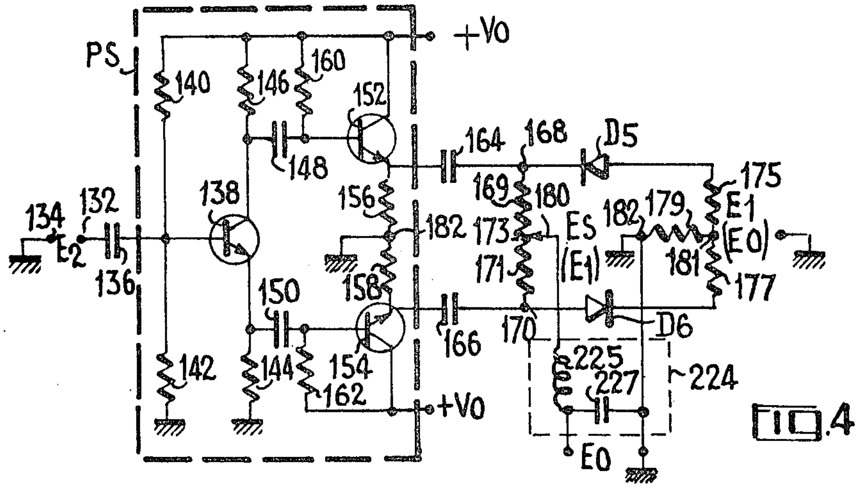
FIG. 4 shows an embodiment of a single-balanced modulator-and-demodulator circuit according to the invention.

The embodiment of the invention illustrated in FIG. 4 is a balanced demodulator of the simple, rather than the double type so far considered. As shown, a first input of the circuit is provided between a grounded terminal 134 and a terminal 132. The input signal from terminal 132 is applied by way of a coupling capacitor 136 to a phase-splitting input circuit generally designated PS, which is similar to the input circuit similarly designated in FIG. 2, and will not therefore be described anew. The output voltages taken from the emitters of the respective transistors 152 and 154 in the phase-splitting section PS, are applied by way of coupling capacitors 164 and 166 to the input terminals 168 and 170 of a simple balanced network comprising a pair of diodes $D_5$ and $D_6$. The input terminals 168 and 170 are the extremities of a resistance chain comprising the fixed outer resistors 169 and 171 and central potentiometer resistor 173 provided with the movable tap 180. The network further includes the series connected resistors 175 and 177, and the diodes $D_5$ and $D_6$ are connected between the respective ends of the series connected resistors 175 and 177, and a respective one of the terminals 168 and 170. The diodes are reversely poled, diode $D_5$ being shown with its negative terminal (cathode) connected to network input terminal 168, and diode $D_6$ with its positive terminal (anode) connected to network input terminal 170. A low-resistance resistor 179 is connected between the common junction 181 of resistors 175 and 177, and ground.

In this embodiment, a second input of the circuit is provided between junction 181 and ground, across the low resistance 179, and the output of the circuit is derived between the potentiometer tap 180, and ground. This output signal may be passed through a lowpass filter 224 to provide the final output signal $E_0$. Filter 224 is shown as including a series inductor 225 and parallel capacitor 227.

In discussing the operation of the FIG. 4 embodiment, it is first assumed that an input signal, such as the reference signal $E_2$ of constant amplitude and radio frequency, is applied to input terminal 132, and no input signal is applied to input terminal 181. The $E_2$ signal is applied through capacitor 136 to the phase splitter circuit PS which operates as earlier described with reference to FIG. 2, to deliver oppositely-phased voltages at the frequency of, and at a constant amplitude corresponding to the amplitude of, the reference signal $E_2$, and these oppositely-phased voltages are applied through coupling capacitors 164 and 166 to the diode network input terminals 168 and 170 respectively. Thus, during every other semi-cycle of the reference voltage when terminal 168 is positive and 170 is negative, the diodes $D_5$ and $D_6$ are simultaneously reverse-biassed, whereas during the other set of alternate reference semi-cycles the diodes are simultaneously forward-biassed. In this condition, moreover, the two opposite-phase voltages applied to terminals 168 and 170 cancel each other and no net output signal appears at output terminal 180, this being ensured by suitable adjustment of potentiometer tap 180.

Assuming now that a suppressed-carrier, amplitude-modulated signal $E_1$ is applied to the input terminal 181, only those semi-cycles of the $E_1$ signal will be passed through diodes $D_5$ and $D_6$ and resistors 169 and 171 to output terminal 180, which occur during the reference semi-cycles which cause the diodes to be forward-biassed. The diode network therefore tends to effect half-wave rectification of the $E_1$ signal, with the output voltage at 180 tending to take the form of the rectified half-waves indicated in dotted lines in the third line of the graph of FIG. 5, said half-waves being positive or negative according as the $E_1$ signal at 181 is in-phase, or is 180° out-of-phase, with the $E_2$ signal at terminal 132.

Figure 5:
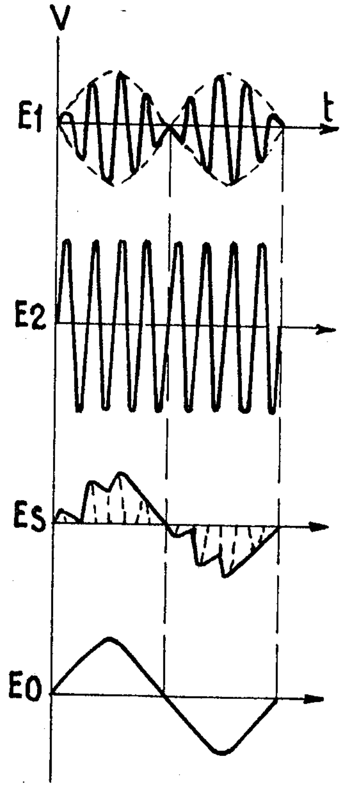
FIG. 5 shows a set of waveforms similar to FIG. 3 for explaining the operation of the circuit of FIG. 4.

The capacitors 164 and 166 cooperate with resistors 169 and 171 (and the respective half sections of resistor 173) to provide delay or integrating circuits whose time constant is selected sufficiently large in respect to the radio-frequency of carrier or reference signal $E_2$, to provide for a smoothing out of the crests of the output signal voltage $E_s$, in the manner indicated in full lines in the third line of FIG. 5. When the rectified, and partly smoothed-out signal thus obtained is passed through the output filter 224, there is finally provided the demodulated audio-frequency waveform $E_0$ herein sinusoidal in form.

The FIG. 4 circuit is also operable as a modulator, in which case an audio-frequency modulating signal ($E_0$) may be applied to the input terminal 181, and a suppressed-carrier amplitude-modulated signal ($E_1$) would be collected from output of filter 224.

Figure 6:
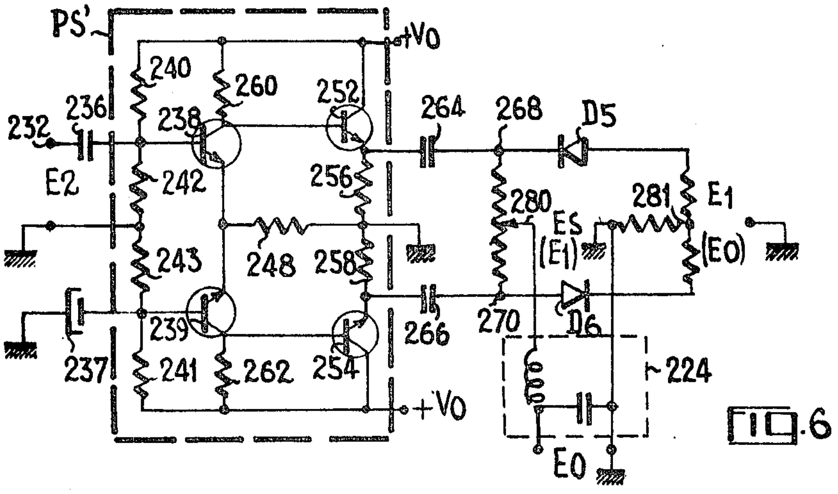
FIG. 6 shows a modified embodiment of a single-balanced modulator-demodulator circuit according to the invention, using an input signal coupling arrangement different from that shown in FIG. 4.

In the modified embodiment shown in FIG. 6, the phase splitter circuit, here designated PS′, is somewhat different from the phase splitter PS used in the embodiments of FIG. 2 or FIG. 4. The reference, or R-F, signal $E_2$ is applied to the input terminal 232, and is thence passed through coupling capacitor 236 to the base of transistor 238. This transistor has its emitter connected to the emitter of a similar transistor 239, whose base is grounded by way of a capacitor 237 of relatively large capacitance. Transistors 238 and 239 have their bases biassed across the positive V*o* voltage line and ground, through the resistors 240–242 and 241–243 respectively. Their collectors are connected to the +V*o* line through the collector-load resistors 260 and 262, and their emitters are connected to ground through the common emitter-load resistor 248. The collectors of 238 and 239 are connected to the bases of the respective impedance-matching transistors 252 and 254, whose emitters are grounded through the emitter-load resistors 256 and 258, and are further connected through capacitors 264 and 266 to the input terminals 268 and 270 of a simple balanced-modulator network comprising the diodes $D_5$ and $D_6$, similar to the corresponding network shown in FIG. 4. The remainder of the circuit is similar to that of FIG. 4.

In the operation of the modification of FIG. 6, an R-F reference signal $E_2$ applied across input terminal 232 and ground produces alternating voltages in phase-opposition on the collectors of input transistors 238 and 239, and these oppositely varying voltages are passed through the impedance-matching transistor stage 252 and 254 and capacitors 264 and 266 to the input terminals 268 and 270 of the diode network. In demodulator operation, a suppressed-carrier amplitude-modulated signal $E_1$ is applied between terminal 281 and ground, and an intermediate output signal $E_s$ is collected across potentiometer terminal 280 and ground, to produce a demodulated signal $E_0$ at the output of low-pass filter 224. In modulator operation, an audio-frequency modulating signal $E_0$ may be applied to terminal 281, and a suppressed-carrier amplitude-modulated signal $E_1$ collected at terminal 280. Both in FIGS. 4 and 6, the transistors are class —A biassed for linear operation.

An important feature of the invention in all of the embodiments disclosed lies in the possibility of using identical transistors (e.g. 2N918 type) throughout, and low-valued resistors, of the order of 1 to 10 kilohms, and usually very low capacitors, of the order of one picofarad. This greatly facilitates the construction of the improved modulator-demodulator circuits as subminiature components in integrated circuits. It is observed however that in certain embodiments a coupling capacitor such as 237 (FIG. 6) may have to be somewhat larger in value and may have to be provided separate from the integrated circuit.

It will be understood that many modifications and variations other than those shown herein may be conceived within the scope of the invention. Thus, while in both single-balanced modulator embodiments shown in FIG. 4 and FIG. 6, the signal designated as $E_1$ (or $E_0$) is shown as coupled to the midpoint of the resistance chain 175–177, said signal (or another one of the three signals involved, e.g. the $E_s$ or $E_1$ signal), may be coupled across the ends of said resistance chain, in which case an output coupling may be used similar to that designated PC in FIG. 2.

Conversely, an input coupling, or phase-splitting network similar to the one designated PS′ (FIG. 6) may of course be used in connection with a double-balanced 4 diode ring network of the kind shown in FIG. 2. It is noted in this respect that the phase splitting network PS′ (FIG. 6) using two input transistors instead of one, has important advantages over the single-transistor phase splitter PS (FIGS. 2 and 4) in that it provides a more constant and accurate 180° phase relationship between the voltages of the split-phase input signal, and requires less critical adjustment of the emitter resistance in order to secure accurately balanced voltage amplitudes.

As another modification that will be found desirable in many cases the unidirectional switching elements, here shown as diodes, may be provided in the form of transistors connected to suitable biassing voltages. As will be apparent to those familiar with the art, the disclosure while set forth herein with major reference to amplitude modulation, is also applicable to phase modulation. In such case, the expression "phase-coherent" as applied in the claims to the signals involved, should be interpreted as meaning that the signals referred are phase-coherent, i.e. are in phase coincidence or in phase opposition, when the modulation factor is zero.

What we claim is:

1. A transformerless balance type amplitude or phase modulator-demodulator circuit arrangement (FIG. 2, 4, 6) comprising:

a single modulating network means (ND) having a first and a second pair of terminals (68, 70; 76, 78 or 168, 170; 175, 177 . . . ), said network means including, between the first and second pair of terminals at letst a pair of unidirectional switching elements ($D_1$–$D_4$, $D_5$, $D_6$) series connected in a ring configuration to present two parallel alternately conducting paths (68, 76 and 70, 78; 168, 175 and 170, 177; . . .);

a third pair of terminals (82, 80; 182, 180; 282, 280);

a pair of non-inductive impedance means (56, 58 and 72, 74; 169, 171 and 175, 177; . . . ), each having a midpoint, said impedance means being connected between said first and second pairs of terminals, respectively, the midpoints (82, 80; 173, 181; . . . ) of said impedance means being coupled to the third pair of terminals (82, 80; 182, 180; . . . );

said network and impedance means interconnection forming a balance network having three pairs of terminals;

means for applying across said first and third pairs of terminals two phase-coherent alternating current input signals ($E_1$, $E_2$)

whereby to deliver across the second pair of terminals an output signal ($E_0$) in phase-coherent relation with both input signals and representing a modulation-demodulation product thereof; and a transformerless input coupling circuit (PS, PS′) connected to further apply one of said input signals across the related balance network pair of input terminals (68, 70; 168, 170; . . . ), said coupling circuit including:

a transistor (38; 138) connected to receive said one input signal on the base electrode thereof;

means (40, 44, 140, 142) connected to bias the transistor for linear opeartion;

a pair of load resistance means (46, 44; 146, 144) connected to the emitter tnd collector electrodes of said transistor respectively; and means (64, 66; 164, 166; . . . ) connecting said emitter and collector electrodes to the respective balance network input terminals (68, 70; 168, 170) of said related pair for applying said one input signal as two covariant opposite-phase voltages across said respective input terminals.

2. A circuit arrangement according to claim 1 wherein (FIG. 6), the coupling circuit (PS′) comprises two transistors (238, 239) having said one input signal applied across their bases;

means interconnecting one pair of similarly designated electrodes of both transistors with each other and with one (248) of said load resistance means (248, 260, 262); and means connecting the remaining pair of electrodes of said transistors to the remaining load resistance means (260, 262) and to said balanced network input terminals (268, 270).

3. A circuit arrangement according to claim 1 wherein the coupling circuit (PS, PS′) includes a phase-splitting circuit and an impedance-matching circuit and connected to apply said opposite-phase voltages to said related input terminals (68, 70; 168, 170; . . . ) of the balanced network, said impedance-matching circuit comprising a pair of transistors (52, 54; 152, 154; . . . ) connected in a symmetrically-arranged common-collector circuit and interposed between the output terminals of said phase-splitting circuit and said related input terminals.

4. A circuit arrangement according to claim 1, further including a transformerless output coupling circuit (PC) for collecting the output signal across said third pair of terminals (76, 78), which output coupling circuit comprises a pair of transistors (104, 106) connected in a push-pull series circuit, means biasing said transistors for linear operation, means connecting control electrodes of said respective transistors to said respective third terminals (76, 78) whereby opposite phase modulation envelope voltage signals will render said push-pull series transistors sensitive to modulation envelope voltage signals in phase-opposed relation, and a load resistance means (108) connected to output electrodes of said push-pull series transistors for deriving a resultant current to produce the output signal across said resistance means (108).

5. A circuit arrangement according to claim 4, wherein said output coupling arrangement (PC) further includes a pair of impedance-matching transistors (88, 90) connected in symmetrically arranged circuits, means (84, 86) connecting input electrodes of said transistors to said respective third pair of terminals (76, 78) and means (100, 102) connecting output electrodes of said transistors to the control electrodes of said push-pull series transistors (104, 106).

6. A circuit arrangement according to claim 1, wherein said non-inductive impedance means comprises resistors (56, 58; 72, 74) symmetrically connected across said unidirectional switching elements ($D_1$–$D_4$) and said three pairs of terminals are provided across the extremities (68, 70; 76, 78) and midpoints (82, 80) of said resistors.

7. A circuit arrangement according to claim 1, wherein the switching network means includes four diodes series connected in aiding relation providing a continuous unidirectionally conducting ring.

8. A circuit arrangement according to claim 1, wherein the switching network means includes (FIGS. 4, 6), two diodes ($D_5$, $D_6$) connected in aiding relation, one diode being connected in one said conducting path, the said first and second pair of terminals being connected to respective resistors (169, 171, and 175, 177), their midpoints (180, 181) providing the third pair of terminals.

9. A circuit arrangement according to claim 1, wherein the transistors are identical and the values of the resistors and capacitors are sufficiently low to facilitate a subminiature construction.

10. A circuit arrangement according to claim 9, further including a transformerless output coupling circuit (PC)

for collecting the output signal across said third pair of terminals (76, 78), which output coupling circuit comprises a pair of transistors (104, 106) connected in a push-pull series circuit, means biasing said transistors for linear operation, means connecting control electrodes of said respective transistors to said respective third terminals (76, 78) whereby opposite phase modulation envelope voltage signals will render said push-pull series transistors sensitive to modulation envelope voltage signals in phase-opposed relation, and a load resistance means (108) connected to output electrodes of said push-pull series transistors for deriving a resultant current to produce the output signal across said resistance means (108).

References Cited

UNITED STATES PATENTS

| | | | |
|---|---|---|---|
| 3,205,457 | 9/1965 | Bell | 332—44 |
| 3,210,570 | 10/1965 | Brock et al. | 307—254 X |
| 3,229,230 | 1/1966 | Feldman | 332—44 |
| 3,273,078 | 9/1966 | Mollinga. | |

ALFRED L. BRODY, Primary Examiner

U.S. Cl. X.R.

307—262; 325—138, 329; 329—50; 332—47